United States Patent [19]

Humbert et al.

[11] Patent Number: 5,780,559
[45] Date of Patent: Jul. 14, 1998

[54] CURABLE FILM-FORMING COMPOSITIONS CONTAINING AMIDE FUNCTIONAL POLYMERS

[75] Inventors: Leigh-Ann Humbert, Allison Park; Daniel E. Rardon, Gibsonia; Michael A. Mayo; Steven V. Barancyk, both of Pittsburgh; James B. O'Dwyer, Valencia, all of Pa.

[73] Assignee: PPG Industries, Inc., Pittsburgh, Pa.

[21] Appl. No.: 681,051

[22] Filed: Jul. 22, 1996

[51] Int. Cl.$^6$ .................................................. C08G 18/00
[52] U.S. Cl. .................................................. 525/452
[58] Field of Search .................................................. 525/452

[56] References Cited

U.S. PATENT DOCUMENTS

| | | | |
|---|---|---|---|
| 3,366,613 | 1/1968 | Kelley | 260/89.5 |
| 4,147,679 | 4/1979 | Scriven et al. | 260/29.2 TN |
| 4,220,679 | 9/1980 | Backhouse | 427/401 |
| 4,271,277 | 6/1981 | Golowina | 525/351 |
| 4,403,003 | 9/1983 | Backhouse | 427/401 |
| 4,543,276 | 9/1985 | Parekh | 427/388.3 |
| 5,053,463 | 10/1991 | Inoue | 525/427 |
| 5,071,904 | 12/1991 | Martin et al. | 524/458 |
| 5,098,947 | 3/1992 | Metzger et al. | 524/507 |
| 5,124,433 | 6/1992 | Inoue | 528/272 |
| 5,196,485 | 3/1993 | McMonigal et al. | 525/327.3 |
| 5,300,537 | 4/1994 | Muller et al. | 523/115 |
| 5,374,682 | 12/1994 | Gouda et al. | 525/185 |
| 5,445,850 | 8/1995 | Das et al. | 427/407.1 |

FOREIGN PATENT DOCUMENTS

| | | |
|---|---|---|
| 0 257 848 | 3/1988 | European Pat. Off. . |
| 0 594 071 | 4/1994 | European Pat. Off. . |
| 0 697 400 | 2/1996 | European Pat. Off. . |
| 49-18126 | 2/1974 | Japan . |
| 6-184073 | 7/1994 | Japan . |
| 8-59950 | 3/1996 | Japan . |
| WO88/02766 | 4/1988 | WIPO . |
| WO94/10211 | 5/1994 | WIPO . |

OTHER PUBLICATIONS

U.S.S.N. 08/681,050 entitled "Amide Functional Monomers and Acrylic Polymers with Amide Functionality", filing date Jul. 22, 1996, assignee PPG Industries, Inc.

Patent Abstracts of Japan, vol. 18, No. 668, Dec. 1994 for JP 06-264022, published Sept. 1994.

Patent Abstracts of Japan, vol. 13, No. 233, May 1989 for JP 01-040552, published Feb. 1989.

*Primary Examiner*—Terressa Mosley
*Attorney, Agent, or Firm*—Kenneth J. Stachel; Krisanne Shideler

[57] ABSTRACT

A film-forming composition is provided comprising: (i) an amide functional polymer, copolymer or oligomer selected from (a) acrylic polymers, (b) polyesters, (c) polyurethanes, (d) polyethers or (e) mixtures thereof; and (ii) an aminoplast crosslinking agent containing methylol and/or methylol ether groups. The acrylic polymers have a plurality of groups of at least one of the structures:

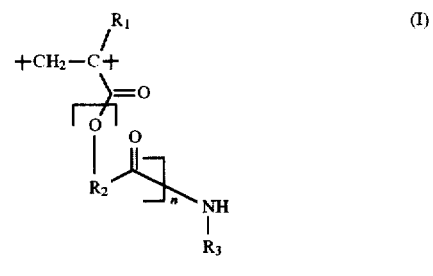

and

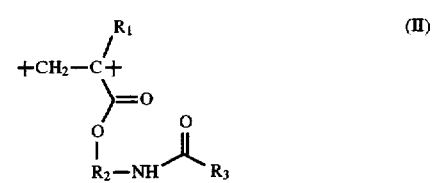

wherein n is 0 or 1, $R_1$ is hydrogen or methyl, $R_2$ is a divalent linking group having about 1 to 30 carbon atoms when the group is of the first structure, or $R_2$ is alkylene having about 2 to 13 carbon atoms when the group is of structure II, and $R_3$ is hydrogen or lower alkyl having 1 to 4 carbon atoms. The (b), (c), and (d) polymers each have a plurality of terminal amide groups. The film-forming composition prior to curing has a theoretical hydroxyl value less than about 50 based on total resin solid weight of the film-forming composition, excluding any hydroxyl functionality associated with N-methylol groups. After curing, the film-forming composition exhibits a high level of acid etch resistance. The film forming composition can also be the clear film-forming composition with a base coat in a multi-component composite coating composition.

35 Claims, No Drawings

CURABLE FILM-FORMING COMPOSITIONS CONTAINING AMIDE FUNCTIONAL POLYMERS

FIELD OF THE INVENTION

The present invention relates to aminoplast-curable film-forming compositions, and multi-component composite coating compositions comprising a pigmented or colored base coat and a transparent or clear coat usually used as the topcoat of a multi-component composite coating.

BACKGROUND OF THE INVENTION

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image. The clear coat is particularly important for these properties.

Coating systems that employ hydroxyl-aminoplast cure mechanisms are well known in coating technology and provide many excellent coating properties. They are inexpensive, durable, and attractive, but it is widely recognized that such coatings, particularly clear coats, have poor resistance to etching by acid. Acid etch resistance in coatings is becoming an increasingly desirable property, particularly for automotive coatings. Aminoplast cured coating systems of the prior art are not highly effective for providing protection against etching caused by acid rain.

Parekh, in U.S. Pat. No. 4,543,276, discloses thermosetting polyurethane coating compositions containing urethane compounds and a polymer or mixture of polymers having one or more functional groups selected from hydroxyl, carboxyl and amide. The reference discloses that the functional groups are present in an amount of about 0.3 to about 15 percent by weight, based on the weight of the polymer. The reference does not teach any reason for selecting or particular advantage for the amide functionality of the polymer(s) in coating compositions.

Kelley, in U.S. Pat. No. 3,366,613, generally discloses the use of polymers derived from N-(acryloxyalkyl)acylamides in coating compositions with aminoplasts. The reference does not disclose the use of such coating compositions as clear coats in color-plus-clear composite coatings nor does the reference teach or suggest any advantage of these polymers in coating compositions to improve acid etch resistance.

It is desirable to provide a coating composition having improved acid etch resistance, utilizing less expensive aminoplast technology, for instance as a coating composition in a color-plus-clear composite coating system.

SUMMARY OF THE INVENTION

In accordance with the present invention, a film-forming composition for coating applications is provided comprising (i) a polymer, which includes oligomer, present in the film-forming composition in amounts of about 10 to 75 percent by weight based on the total weight of resin solids in the film-forming composition and selected from the group consisting of (a) an acrylic polymer, copolymer or oligomer containing a plurality of groups of at least one of the structures:

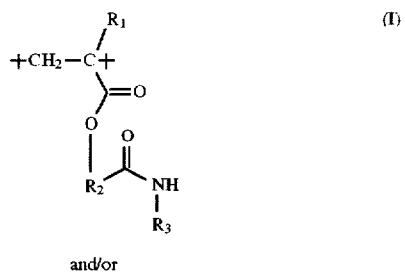

and/or

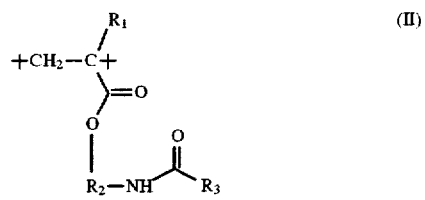

wherein $R_1$ is hydrogen or methyl, $R_2$ is a divalent linking group having about 1 to 30 carbon atoms for Structure I or $R_2$ is an alkylene group having about 2 to 13 carbon atoms for Structure II, and $R_3$ is hydrogen or lower alkyl having 1 to 4 carbon atoms; (b) a polyester polymer or oligomer containing a plurality of terminal amide groups of at least one of the structures:

and/or

wherein $R_3$ is as defined above; (c) a polyurethane polymer or oligomer containing a plurality of terminal amide groups of at least one of the structures of Structures III or IV above; (d) a polyether polymer or oligomer containing a plurality of terminal amide groups of at least one of the structures of Structures III or IV above; and (e) mixtures of more than one of (a), (b), (c) and (d); and (ii) an aminoplast crosslinking agent containing methylol and/or methylol ether groups, present in the film-forming composition in amounts of about 25 to 90 percent by weight based on the total weight of resin solids in the film-forming composition.

A multi-component composite coating composition is also provided. The coating composition comprises a pigmented film-forming composition serving as a base coat and a clear film-forming composition serving as a transparent coat over (i.e., on top of) the base coat. The transparent coat, or clear coat, is derived from the curable film-forming composition described above. In this embodiment, the clear film-forming composition can have as the acrylic polymer, copolymer or oligomer (i) (a) the acrylic polymer, copolymer, and/or oligomer containing a plurality of groups of the structure:

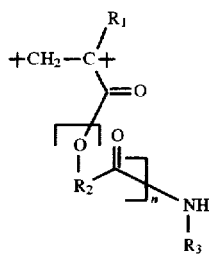

(V)

wherein n is 0 or 1, $R_1$ is hydrogen or methyl, $R_2$ is a divalent linking group having 1 to 30 carbon atoms, and $R_3$ is hydrogen or lower alkyl having 1 to 4 carbon atoms.

Also, for any film-forming composition, the acrylic polymer, copolymer and/or oligomer with groups of Structure V can be used in a mixture with the aforementioned (i) (a), (b), (c), and/or (d) polymers, copolymers and/or oligomers.

DETAILED DESCRIPTION

None of the chemical structures depicted herein are intended to be limited to any depicted particular bond angles of the atoms, but the chemical structures indicate which atoms are bonded to adjacent atoms in the structure. Also, the use of the term "polymer" is meant to include both homopolymers and copolymers and oligomers, where the term "copolymer" means two or more different monomers or oligomers are polymerized to form the copolymer. The polymer is preferably a copolymer and the copolymer may be a random copolymer of two or more different monomers. Also, the copolymer may be a blocked or segmented (segmented means a short block that occurs more frequently than the longer block) copolymer of two or more different monomers. The random copolymers are preferred because of their relative ease of synthesis. All possible copolymers repeat unit sequences and tacticity sequences may co-exist in the copolymers of this invention.

The acrylic polymers or oligomers of (a) above that can be used in the film-forming composition of the present invention have a plurality of groups of at least one of the Structures I and/or II. In the acrylic polymers with these structures, $R_2$ is a divalent linking group having about 2 to 13, and more preferably 3 to 13 carbon atoms (for Structure I) or $R_2$ is alkylene having 2 to 13 carbon atoms (for Structure II). When the group is of Structure I, $R_2$ may be cycloaliphatic, or linear or branched aliphatic such as alkylene, including methylene, methyl methylene, ethylene, methyl ethylene, propylene, dimethyl propylene, butylene, pentylene, and the like; and may be substituted. Suitable substituents include any that will not interfere with subsequent crosslinking reactions and may include groups such as halides. $R_2$ may include functional linkages such as urethane, ester, amide, and the like. When the group is of Structure I, $R_2$ is most preferably pentylene and $R_3$ is most preferably hydrogen or methyl.

When the group is of Structure II, $R_2$ may be linear or branched aliphatic such as alkylene, including methyl methylene, ethylene, methyl ethylene, propylene, dimethyl propylene, butylene, and the like, and may be substituted as above. When the group is of Structure II, $R_2$ is preferably ethylene or methyl ethylene and $R_3$ is preferably methyl.

Either or both of the above group Structures I and II may be present in one or more acrylic polymers or oligomers.

Monomers that form groups of Structure I above may be prepared by reacting a hydroxyl functional amide with (meth)acrylic acid or anhydride at any temperature and pressure and for a period of time for the reaction to proceed. Preferably, the reaction of the hydroxyl functional amide with an anhydride is performed at a temperature ranging from about 50° to about 100° C. at times ranging from about 8 to about 48 hours. A catalyst may optionally be employed, which can be a basic catalyst such as sodium hydroxide, sodium carbonate, sodium hydrogen carbonate, tertiary amines such as triethylamine, 2,2,2-diazabicyclooctane, N,N-dimethylaniline, pyridine, dialkyl amino pyridines, polydimethylaminopyridine, 4-dimethylaminopyridine, 4-methylmorpholine, N-methylpiperazine, N-methylpiperidine, and organic bases such as quaternary ammonium hydroxides, 4-pyrrolidinopyridine, and imidazole. The amount of catalyst is not critical and may, for example, be as low as about 6 p.p.m. When a catalyst is used, 4-dimethylaminopyridine is preferred.

An inhibitor may also be included to prevent premature polymerization of the product monomer where the polymerization inhibitor can be any conventional polymerization inhibitor known to those skilled in the art. Without limitation the inhibitor may be chosen from the following classical inhibitors, for example from sterically hindered phenols such as 4-tert-butylpyrocatechol, 2,6-di-tert-butyl-4-methylphenol, which is preferred, N-nitrosodi-phenylamine, p-tert-butylcatechol, phenothiazine, N-phenyl-naphthylamine, 2,2'-methylene-bis-(4,6-di-tert-butylphenol), 2,2'-methylenebis(6-tert-butyl-4-methylphenol) available as 2,2,4,6-Ralox® and Ralox® 46 antioxidants from Raschig GmbH, Germany, p-methoxyphenol and di-tert-butyl-p-cresol. The inhibitor can be employed in a proportion of between approximately 0.1% and up to 1.0% by weight relative to the monomer(s) depending on the specific inhibitor used.

The monomers may also be prepared by transesterification of (meth)acrylic acid esters with a hydroxyl functional amide. The transesterification reaction can be performed at conditions of temperature, time, and pressure as known to those skilled in the art for transesterification reactions. Preferably, the transesterification is conducted at temperatures ranging between about 90° to about 115° C. and at times between about 6 to about 16 hours in the presence of a transesterification catalyst such as dibutyltin oxide or lithium hydroxide. Although other conventional transesterification catalysts known to those skilled in the art can be used, these catalysts can be used in approximate amounts of 0.1 to 2% by weight of the monomer reactants. Preferably, a three to five fold molar excess of the (meth)acrylate ester is employed. The by-product alcohol can be removed by distillation; in the case of ethyl acrylate, it is removed as an ethanol/ethyl acrylate azeotrope. Inclusion of an inhibitor, as discussed above, and sparging the reaction mixture with air are preferably used to prevent polymerization of the reaction mixture. In this reaction the preferred inhibitor is 4-methoxyphenol.

Suitable hydroxyl functional amides have the following structure:

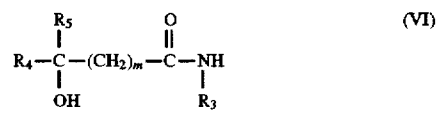

(VI)

where $R_3$ is as defined above, $R_4$ and $R_5$ are each independently hydrogen or lower alkyl having 1 to 4 carbon atoms and m is an integer from 0 to 6. When m=0, either $R_4$ or $R_5$ is alkyl. Such hydroxyl functional amides may be prepared by reacting a hydroxyl functional acid or ester with ammonia or a primary amine. Examples of hydroxyl functional acids and esters include lactic acid and ethyl lactate. respectively. including mixtures thereof and other hydroxy functional monocarboxylic acids and esters known to those skilled in the art. The reaction with the lower alkyl esters. like alkyllactates. may be conveniently carried out at ambient pressure either neat or in aqueous or alcoholic media at temperatures ranging from about 0° to about 50° C. at times ranging from about 2 to about 120 hours. Aqueous ammonium hydroxide or commercially available aqueous solutions of the lower alkyl amines can be used. Preferably. "lower alkyl" means the hydrocarbon group has 1 to 4 carbon atoms. Any solvent and by-product alcohol are conveniently removed from the product under reduced pressure and maximum temperatures of around 60° C. In instances in which water is present in the reaction. residual water not removed during the reduced pressure strip can be removed from the hydroxyl functional amide by azeotropic reflux at ambient pressure with a solvent such as cyclohexane or toluene or other similar solvents known to those skilled in the art.

Alternatively. the hydroxyl functional amides may be prepared by ring-opening a lactone with ammonia or a primary amine and the resulting hydroxyl functional amide can be reacted with (meth)acrylic acid or anhydride. Examples of suitable lactones include those of the following general formula:

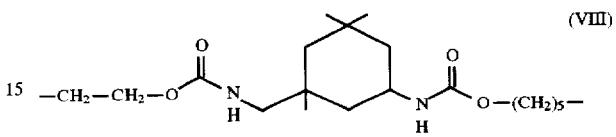

where $R_4$ and $R_5$ are as defined above and x is an integer from 1 to 3. Suitable lactones include caprolactones such as gamma-caprolactone. delta-caprolactone. epsilon-caprolactone. monoalkyl caprolactones, such as methyl- and ethyl-epsilon-caprolactone. dialkyl caprolactones, such as dimethyl- and diethyl-epsilon-caprolactone. butyrolactone and the like. Preferably. the lactone is epsilon-caprolactone.

Suitable primary amines include lower alkyl amines such as methylamine. ethylamine. propylamine. butylamine. and the like. Preferably. the lactone is ring-opened with ammonia or methylamine. Such reactions are preferably conducted in aqueous media and at ambient pressure. although pressures above atmospheric pressure can be used. at times in the range from about 4 to about 36 hours and at temperatures ranging from about 0° to about 50° C. The aqueous media can employ ammonia or methylamine in aqueous solution. The particular conditions within the foregoing ranges of conditions depend on the particular reactants used. Upon completion of the reaction. water is preferably removed from the product under reduced pressure. A minimum pressure of 1 to 2 millimeters of mercury (mm) and maximum temperature of around 60° C. are preferred. Any residual water that may not be removed during the reduced pressure strip can be removed from the hydroxyl functional amide by azeotropic reflux at ambient pressure with a solvent such as cyclohexane or toluene.

Other monomers that form groups of Structure I are. for instance. the reaction product of a hydroxyl functional vinyl monomer such as hydroxyethyl methacrylate and the like. a diisocyanate. and a hydroxyl functional amide such as a lactone that has been ring-opened with ammonia. In this embodiment. $R_2$ of Structure I has urethane linkages.

Examples of suitable aromatic diisocyanates are 4,4'-diphenylmethane diisocyanate and toluene diisocyanate Examples of suitable aliphatic diisocyanates are straight chain aliphatic diisocyanates such as 1,6-hexamethylene diisocyanate. Also. cycloaliphatic diisocyanates can be employed. Examples include isophorone diisocyanate. which is preferred. and 4,4'-methylene-bis-(cyclohexyl isocyanate).

In one embodiment of the invention. the amide functional vinyl monomer that forms groups of Structure I is the reaction product of hydroxyethyl methacrylate, isophorone diisocyanate. and 6-hydroxycaproamide. and $R_2$ has the structure:

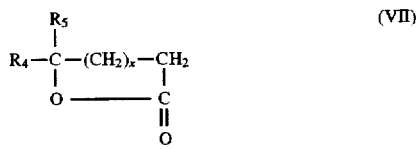

In this embodiment. the hydroxyl functional amide is initially reacted with the diisocyanate at a maximum temperature of around 60° C. in a suitable solvent. Dibutyltin dilaurate is typically employed as a catalyst for the reaction. but other catalysts for the reaction of hydroxyl groups with isocyanate groups known in the art may also be used. A ratio of hydroxyl groups on the hydroxyl functional amide monomer to isocyanate groups of about 0.5 to about 0.7 can be employed to minimize the amount of unreacted isophorone diisocyanate remaining upon completion of the initial step and thus minimize formation of di(meth)acrylate adduct in the following step. A hydroxyl functional (meth)acrylate monomer is then reacted with the remaining isocyanate functional groups at a temperature less than around 100° C.. preferably between 65° and 75° C. Any inhibitor known to those skilled in the art. as discussed above. can be included in the reaction to prevent polymerization. Upon completion of the reaction. the monomer can be reduced with a suitable solvent; relatively polar solvents such as alcohols are preferred.

Monomers that form groups of Structure II may be prepared by reacting an N-acyl substituted alkanol amine such as an N-acetyl alkanol amine with (meth)acrylic acid or anhydride. Preferred amides of this type include N-acetyl ethanolamine and N-acetyl propanolamine.

The acrylic polymers can be copolymers of at least one ethylenically unsaturated monomer with one or more monomers that yield groups of Structures I and/or II above upon addition polymerization. Examples of ethylenically unsaturated monomers that can be used include virtually any known to those skilled in the art such as acid functional monomers including. for example. itaconic acid. acrylic acid. and methacrylic acid; acrylamide; methacrylamide; alkyl esters of acrylic acid or methacrylic acid; other polymerizable ethylenically unsaturated monomers including: vinyl aromatic compounds such as styrene and vinyl toluene: nitriles such as acrylonitrile and methacrylonitrile; vinyl and vinylidene halides such as vinyl chloride and vinylidene fluoride and vinyl esters such as vinyl acetate; and hydroxyl functional monomers (collectively referred to as hydroxyl functional alkyl (meth)acrylate monomers) such as hydroxyethyl acrylate, hydroxypropyl acrylate, hydroxyethyl methacrylate, and hydroxypropyl methacrylate.

Ethylenically unsaturated monomers having acid functionality. if used. preferably are used in low amounts of about 1 to 5 percent, most preferably about 1 to 3 percent by weight of the total monomers. The amount of the acid functional monomer is limited further for coating applications other than clear coats when copolymerized with amide functional vinyl compounds derived from diisocyanates.

These are the compounds that result in $R_2$ of Structure I having urethane linkages like that of Structure VIII. In this case the acid functional monomers can be used in amounts of about 2 percent by weight or less. All of these weight percentages are based on the total weight of the monomers added together to prepare the polymer.

Suitable alkyl esters of acrylic acid or methacrylic acid for use as the ethylenically unsaturated monomers are but are not limited to methyl methacrylate, ethyl methacrylate, butyl methacrylate, ethyl acrylate, butyl acrylate, and 2-ethylhexyl acrylate. For clear coat application, the at least one ethylenically unsaturated monomer for acrylic copolymers can be one or more alkyl esters of acrylic acid or methacrylic acid and optionally one or more other polymerizable ethylenically unsaturated monomers.

Again, for clear coat applications, the acrylic polymers may contain small amounts (less than 25 percent by weight based on total weight of monomers used to prepare the polymer or oligomer) of the hydroxyl functionality. Hydroxyls can be incorporated into the acrylic polymer or oligomer through the use of hydroxyl functional alkyl (meth)acrylate monomers although their use is not preferred. When used, they also can be copolymerized with the other acrylic monomers.

The acrylic polymer or oligomer may be prepared by solution polymerization techniques in the presence of suitable initiators such as organic peroxides or azo compounds, for example, benzoyl peroxide or N,N-azobis (isobutyronitrile). The polymerization may be carried out in an organic solution in which the monomers are soluble by techniques conventional in the art. Other suitable polymerization techniques include emulsion or suspension polymerization as are known to those skilled in the art.

The acrylic polymer or oligomer having a plurality of groups of Structures I and/or II typically has a number average molecular weight ($M_n$) of from about 1000 to 10,000, preferably from about 1000 to 5000 as determined by gel permeation chromatography using a polystyrene standard, a weight average molecular weight ($M_w$) of from about 1500 to 20,000, preferably from about 2000 to 6000 as determined by gel permeation chromatography using a polystyrene standard. When $M_n$ and $M_w$ are referred to elsewhere in this application, they are also determined by gel permeation chromatography using polystyrene standards. The acrylic polymer or oligomer typically has an amide equivalent weight less than about 1000, preferably within the range of about 200 to 600, based on equivalents of reactive amide groups in the groups of Structures I and/or II. Here and elsewhere in the application, the equivalent weight is a calculated value based on the relative amounts of the various ingredients used in making the acrylic or other polymer with amide functionality and is based on solids of the acrylic or other polymer.

The amide functional acrylic polymer or oligomer of (a) having a plurality of groups of Structures I and/or II, when present in the film-forming composition, can be used in amounts of about 10 to 75, preferably about 25 to 70 percent by weight based on the total weight of resin solids in the film-forming composition.

Linear or branched polyester polymers of (b) containing a plurality of terminal amide groups of the Structures III and/or IV may also be used in the film-forming composition of the present invention and may be prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters is also possible. Either or both of the above amide structures (III and IV) may be present in one or more polyester polymers or oligomers.

The polyols which are usually employed in making the polyester include dihydric alcohols known to those skilled in the art. Nonexclusive examples include: ethylene glycol, neopentyl glycol, hydrogenated Bisphenol A, cyclohexanediol, butyl ethyl propane diol, trimethyl pentane diol, 1,6-hexanediol, cyclohexane-dimethanol, 3-hydroxy-2, 2-dimethylpropyl 3-hydroxy-2,2-dimethylpropanoate, caprolactonediol, for example, the reaction product of epsilon-caprolactone and ethylene glycol, hydroxyalkylated bisphenols, polyether glycols, for example, poly (oxytetramethylene) glycol and the like. Polyols of higher functionality may also be used. Examples include trimethylolpropane, trimethylolethane, pentaerythritol and the like known to those skilled in the art.

The acid component of the polyester can be primarily monomeric carboxylic acids or anhydrides thereof having 2 to 18 carbon atoms per molecule as known to those skilled in the art. Among the acids which are useful are cycloaliphatic acids and anhydrides such as phthalic acid, isophthalic acid, terephthalic acid, tetrahydrophthalic acid, hexahydrophthalic acid and anhydride, methylhexahydrophthalic acid and anhydride, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used.

Amide functional groups of Structure III may be incorporated into the polyester by reacting an acid terminal or lower alkyl ester terminal polyester with a hydroxyl functional amide. Such hydroxyl functional amides are prepared as described above. The incorporation reaction may be performed using typical esterification/transesterification reaction conditions known to those skilled in the art.

Amide functional groups of Structure III may alternatively be incorporated into the polyester by first reacting a hydroxyl functional amide with a diisocyanate to form an isocyanate functional amide, and then reacting a hydroxyl terminal polyester with the isocyanate functional amide. Such reactions employ typical conditions for urethane formation, as known to those skilled in the art.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Isophorone diisocyanate is preferred.

Amide functional groups of Structure IV may be incorporated into the polyester by reacting an acid terminal polyester with an N-acyl alkanol amine such as an N-acetyl alkanol amine like N-acetyl lower alkanol amine. As employed for alkanol amines and alkanol amides, the term "lower" designates those aliphatic radicals which have up to four carbon atoms in a straight or branched chain. Preferred amides of this type include N-acetyl ethanolamine and N-acetyl propanolamine.

Amide functional groups of Structure IV may alternatively be incorporated into the polyester by first reacting an N-alkanol substituted amide, like lower alkanol amides, with a diisocyanate to form an isocyanate functional amide and then reacting a hydroxyl terminal polyester with the isocyanate functional amide. Such reactions employ typical conditions for urethane formation, as known to those skilled in the art.

Linear or branched polyurethane polymers of (c) containing a plurality of terminal amide groups of the Structures III and/or IV may also be used in the film-forming composition of the present invention and may be prepared by the reaction of polyols and polyisocyanates using techniques known to those skilled in the art. Either or both of the above amide structures may be present in one or more polyurethane polymers.

The polyols which are usually employed in making the polyurethane include those disclosed above for the preparation of the polyester.

Examples of suitable aromatic diisocyanates are those disclosed above for the preparation of Structure VIII. Examples of suitable higher polyisocyanates are 1,2,4-benzene triisocyanate, polymethylene polyphenyl isocyanate, and biurets and isocyanurates of diisocyanates. Isophorone diisocyanate is preferred.

Amide functional groups of Structure III may be incorporated into an isocyanate functional polyurethane by reacting the isocyanate groups on the polyurethane with a hydroxyl functional amide. Such hydroxyl functional amides may be prepared as described above. Amide functional groups of Structure III may be incorporated into a hydroxyl functional polyurethane by first reacting a hydroxyl functional amide with a diisocyanate to form an isocyanate functional amide and then reacting the hydroxyl functional polyurethane with the isocyanate functional amide. Such reactions employ typical conditions for urethane formation, as known to those skilled in the art.

Amide functional groups of Structure IV may be incorporated into an isocyanate functional polyurethane by reacting the isocyanate groups on the polyurethane with an N-acyl alkanol amine such as an N-acetyl alkanol amine as discussed above. Preferred amides of this type include N-acetyl ethanolamine and N-acetyl propanolamine.

Amide functional groups of Structure IV may be incorporated into a hydroxyl functional polyurethane by first reacting an N-alkanol substituted amide with a diisocyanate to form an isocyanate functional amide, and then reacting the hydroxyl functional polyurethane with the isocyanate functional amide. Such reactions employ typical conditions for urethane formation, as known to those skilled in the art.

Linear or branched polyether polymers of (d) above containing a plurality of terminal amide groups of the Structures III and/or IV may also be used in the film-forming composition of the present invention. These may be prepared by the polyalkoxylation of polyols with alkylene oxides such as ethylene oxide and propylene oxide using techniques known to those skilled in the art. Either or both of the above amide Structures III and IV may be present in one or more polyether polymers or oligomers. The polyols which are usually employed in making the polyether include those disclosed above for the preparation of the polyester. A preferred polyether is a branched polyether prepared from trimethylol propane and ethylene oxide, available commercially as POLYOL TP30 from Perstorp AB.

Amide functional groups of Structure III may be incorporated into the polyether by first reacting a hydroxyl functional amide with a diisocyanate to form an isocyanate functional amide and then reacting hydroxyl groups on the polyether with the isocyanate functional amide. Such reactions employ typical conditions for urethane formation, as known to those skilled in the art.

Amide functional groups of Structure IV may be incorporated into the polyether by first reacting an N-alkanol substituted amide, as discussed above, with a diisocyanate to form an isocyanate functional amide, and then reacting hydroxyl groups on the polyether with the isocyanate functional amide. Such reactions employ typical conditions for urethane formation as known to those skilled in the art.

The following tables, Tables I and II, summarize molecular and equivalent weight ranges for each type of polymer (i) (a), (b), (c), and (d), as well as amounts of each polymer, when present in a film-forming composition in accordance with the present invention such as a coating composition like a clear coat.

TABLE I

| | Polymer or oligomer | $M_n$ | Preferred $M_n$ | $M_w$ | Preferred $M_w$ |
|---|---|---|---|---|---|
| (a) | acrylic | 1000 to 10,000 | 1000 to 5000 | 1500 to 20,000 | 2000 to 6000 |
| (b) | polyester | 500 to 5000 | 1000 to 3000 | 1000 to 10,000 | 2000 to 6000 |
| (c) | polyurethane | 500 to 5000 | 1000 to 3000 | 1000 to 10,000 | 2000 to 6000 |
| (d) | polyether | 500 to 3000 | 800 to 2000 | 1000 to 6000 | 1000 to 3000 |

TABLE II

| | Polymer or oligomer | Amide Equivalent weight | Preferred Amide Equivalent weight | Amount in coating | Preferred amount in coating |
|---|---|---|---|---|---|
| (a) | acrylic | less than 1000 | 200 to 600 | 10 to 75 | 25 to 70 |
| (b) | polyester | 200 to 1000 | 200 to 600 | 10 to 75 | 25 to 70 |
| (c) | polyurethane | 200 to 1000 | 200 to 750 | 10 to 75 | 25 to 70 |
| (d) | polyether | 200 to 1000 | 200 to 600 | 10 to 75 | 25 to 70 |

For mixtures of the polymers listed in Table I, the combination of two or more of these polymers would be in amounts in a film-forming composition that the mixture is in the range of 10 to 75 percent by weight. Also, the mixture would have polymers with amide equivalent weights within the ranges of Table II.

The film-forming composition of the present invention also includes an aminoplast crosslinking agent containing methylol and/or methylol ether groups and may be any aminoplast known to those skilled in the art. Aminoplasts are obtained from the reaction of formaldehyde with an amine or amide. The most common amines or amides, which are preferred, are melamine, urea, or benzoguanamine. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol and hexanol.

Preferably, the aminoplasts which are used are melamine-, urea-, or benzoguanamine-formaldehyde condensates etherified with an alcohol containing from one to four carbon atoms. The aminoplast is present in amounts of about 25 to 90, preferably about 25 to 55, and more preferably about 30 to 45 percent by weight based on the total weight of resin solids in the film-forming composition.

Usually, the film-forming composition will also preferably contain catalysts to accelerate the cure of the aminoplast and amide groups. Examples of suitable catalysts are acidic materials and include acid phosphates and sulfonic acid or a substituted sulfonic acid such as dodecylbenzene sulfonic acid or paratoluene sulfonic acid. The catalyst is usually present in an amount of about 0.5 to 5.0 percent by weight, preferably about 0.5 to 1.5 percent by weight, based on the total weight of resin solids in the film-forming composition. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40 percent by weight based on total resin solids.

In the film-forming composition of the present invention, preferably the equivalent ratio of the pendant and/or terminal amide groups in the polymers or oligomers to methylol or methylol ether groups in the aminoplast is from about 0.5:1 to about 2:1 and is sufficient to form a crosslinked film. The amide functionality on the polymers or oligomers is preferably the predominant functionality that crosslinks with the methylol or methylol ether groups of the aminoplast. The resultant crosslinked coating exhibits a high level of acid etch resistance. By "high level", it is meant that resistance to etching by acid rain is significantly improved compared to conventional hydroxyl-aminoplast cured coating compositions.

Conventional coating systems that contain hydroxyl functional film-forming resins and aminoplast crosslinking agents rely on a cure mechanism wherein hydroxyl groups on the resin react with the aminoplast to form ether linkages. See, for example, European Patent Application No. 0 257 848, regarding the hydroxyl-aminoplast cure mechanism. Although not intending to be bound by any theory, it is believed that such ether linkages are vulnerable to acid attack and hence show poor acid etch resistance. Also, without any intention to be bound by any theory, it is believed that the predominant crosslinking mechanism in the film-forming composition of the present invention is between the pendant and/or terminal amide groups of the polymers and/or oligomers and the methylol and/or methylol ether substituted nitrogens of the aminoplast.

Preferably, prior to curing, the film-forming composition of the present invention comprising the polymer(s) having the pendant and/or terminal amide groups and the aminoplast has a theoretical hydroxyl value less than 50, preferably less than 25, and more preferably 0, based on solid weight of the film-forming composition. Such a hydroxyl value does not include or take into account any hydroxyl functionality associated with N-methylol groups such as those in an aminoplast.

By "theoretical hydroxyl value", it is meant the calculated value based on the relative amounts of the various ingredients used in making the film-forming composition, rather than the actual hydroxyl value which is measured on the film-forming composition itself by conventional analytical techniques.

The film-forming composition of the present invention may contain color pigments conventionally used in surface coatings and may be used as a high gloss monocoat; that is, a high gloss pigmented coating. By "high gloss", it is meant that the cured coating has a 20° gloss and/or a DOI ("distinctness of image") measurement of at least about 80 as measured by standard techniques known to those skilled in the art.

The film-forming composition of the present invention may be solventborne or waterborne. Suitable organic solvents include any known to those skilled in the art of formulating film-forming compositions. Nonexclusive examples of these are: n-amyl propionate, methyl n-amyl ketone, ethyl alcohol, SOLVESSO 100 (aromatic solvent mixture available from Exxon Chemical Co.); DOWANOL PM (Propylene glycol methyl ether); DOWANOL PM acetate (Propylene glycol methyl ether acetate); and n-amyl alcohol. The solids content of the film-forming composition generally ranges from about 25 to about 55 percent by weight.

The film-forming composition of the present invention is preferably used as the clear coat layer in a multi-component composite coating composition such as a "color-plus-clear" coating system, which includes at least one pigmented or colored base coat and at least one clear coat. In this embodiment, the clear film-forming composition may have or include an acrylic polymer with a plurality of groups of the Structure V:

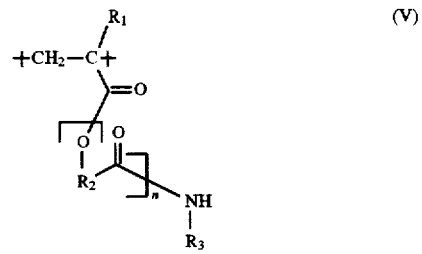

(V)

wherein n is 0 or 1, $R_1$ is hydrogen or methyl, $R_2$ is alkylene having 1 to 30 carbon atoms, and $R_3$ is hydrogen or lower alkyl having 1 to 4 carbon atoms. Preferably, $R_3$ is a lower alkyl group, more preferably a methyl group. Monomers that form the groups of the above Structure V include acrylamide and methacrylamide (n=0) as well as those monomers that form the group of Structure I described above (n=1).

Such acrylic polymers may be prepared as discussed above by copolymerizing one or more monomers that yield groups of Structure V upon addition polymerization; alkyl esters of acrylic acid or methacrylic acid such as any of those discussed earlier; and, optionally, one or more other polymerizable ethylenically unsaturated monomers such as any of those discussed earlier.

The acrylic polymer having a plurality of groups of Structure V typically has a number average molecular weight as indicated in Table I and has an amide equivalent weight as indicated in Table II, based on equivalents of reactive amide groups in the groups of Structure V.

The amide functional acrylic polymer having a plurality of groups of Structure V with n=0 in the clear coat composition is used in amounts of about 10 to 75, preferably about 25 to 70 percent by weight based on the total weight of resin solids in the clear coat film-forming composition as shown in Table II.

The film-forming composition of the base coat in the color-plus-clear multi-component composite can be any of the compositions useful in coatings applications, particularly automotive applications, as known to those skilled in the art. Examples of base coats include suitable organic solvent or diluent-based solvent-based, aqueous-based including water thinnable, or powder base coats. The film-forming composition of the base coat comprises a resinous binder and a pigment to act as the colorant. The resinous binders are the conventional physically drying and/or chemically crosslinking resinous binders such as active hydrogen-containing polymers like polyester, including alkyds; polyurethane, including epoxy-functional polyurethanes; and/or acrylate resins. The resinous binder for organic solvent-based base coats can be like those described in U.S. Pat. No. 4,220,679, at column 2, line 24, continuing through column 4, line 40, and U.S. Pat. No. 5,196,485 (McMonigal, et. al.). Waterborne base coats in color-plus-clear composites are disclosed in U.S. Pat. No. 4,403,003 and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Also, the base coats may optionally have for the resinous binder crosslinking agents, for example, aminoplasts like melamine derivatives, or isocyanate derivatives.

Additionally, the one or more coloring pigments for the base coats can be inorganic and/or organic colored or metallic and/or non-metallic pigments. The metallic flake-type pigmentation known in the art are those for the production of the so-called "glamour metallic" finishes chiefly upon the surface of automobile bodies. Suitable metallic pigments include, in particular, aluminum flake, copper bronze flake and metal oxide coated mica. The non-metallic color pigments can be those conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids. Non-exclusive examples of suitable pigments for the base coat are described in the aforementioned U.S. Pat. Nos. 4,220,679; 4,403,003 and 4,147,679.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent, i.e., organic solvent or water, out of the base coat film by heating or by an air drying period. This is the case even with the wet-on-wet application techniques so some of the solvents from the base coat composition can flash as the film begins to form. Preferably, the heating will only be for a short period of time, sufficient to ensure that the clear coat can be applied to the base coat without the former dissolving the base coat composition, yet insufficient to fully cure the base coat. Suitable drying conditions will depend on the particular base coat composition, and on the ambient humidity with certain waterborne compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed, that is, exposed to ambient conditions for about 1 to 20 minutes.

The clear coat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about 0.5–5 mils (12.7 to 127 microns), preferably 1.2–3 mils (30.5 to 76.2 microns).

The invention will be further described by reference to the following examples. Unless otherwise indicated, all parts are by weight.

EXAMPLE A (Comparative)

A hydroxyl functional acrylic polymer was prepared from the following ingredients:

| Ingredients | Weight in parts |
|---|---|
| Initial Charge | |
| xylene | 10.7 |
| SOLVESSO® 100[1] | 10.7 |
| isobutanol | 4.3 |
| Charge I | |
| hydroxypropyl acrylate | 40.0 |
| butyl methacrylate | 19.0 |
| butyl acrylate | 19.0 |
| styrene | 20.0 |
| acrylic acid | 2.0 |
| t-dodecyl mercaptan | 0.5 |
| Charge II | |
| xylene | 8.7 |
| SOLVESSO 100 | 6.4 |
| VAZO® 67[2] | 5.0 |
| Charge III | |
| SOLVESSO 100 | 1.1 |
| VAZO 67 | 0.4 |
| Charge IV | |
| SOLVESSO 100 | 1.1 |
| VAZO 67 | 0.4 |

[1] aromatic solvent mixture available from Exxon Chemical Co.
[2] 2,2'-dimethylazobis (isobutyronitrile) available from E.I. du Pont de Nemours & Co., Inc.

The initial charge was added to a 5-liter round bottom 4-neck flask equipped with mechanical agitation, nitrogen inlet, reflux condenser, and two dropping funnels (using a nitrogen blanket). The charge was heated to reflux (115° C.). At reflux, Charges I and II were simultaneously and uniformly added over a two-hour period maintaining reflux conditions. Upon completion of Charges I and II, Charge III was added and the reaction held for one hour. Charge IV was added and the reaction held one more hour. The polymer was characterized as having 69% solids, hydroxy value of 95, and peak weight average molecular weight of 7000.

EXAMPLES B and C

Table III lists ingredients used for the preparation of polymers having amide functionality. In Example B the amide functionality results from the addition polymerization reaction of methacrylamide and in Example C from acrylamide.

The procedure used for Examples B and C involved adding Charge 1 to a suitable reactor equipped with a condenser and heated to reflux (120° C.). Charges 2, 3 and 4 were each separately mixed. Charge 2 was added to the reactor over 3.5 hours. Addition of Charges 3 and 4 began 15 minutes after the beginning of Charge 2 and was carried out over a period of 3 hours. After the completion of Charges 3 and 4, the reaction was held at reflux for one hour. Charge 5 was then added over 0.5 hour and the reaction held after the completion of this charge for an additional two hours for Example B and one hour for Example C. Approximately 700 grams (g) of solvent for Example B and 735 (g) of solvent for Example C were then removed from the reaction product under reduced pressure.

The resulting polymers with amide functionality of Examples B and C had the following properties:

| Property | Example B | Example C |
|---|---|---|
| % solids by weight | 59.3 | 61.4 |
| viscosity[3] | Y+ | Z3+ |
| Mn | 2629 | 1959 |
| Mw | 5504 | 5893 |
| Amide equivalent weight | 369.6 | 320.3 |

[3] Gardner-Holdt scale.

TABLE III

| Ingredients | Example B (Weight in grams) | Example C (Weight in grams) |
|---|---|---|
| Charge 1 | | |
| DOWANOL® PM[3] | 400.0 | 400.0 |
| triphenylphosphite | 2.00 | 2.00 |
| Charge 2 | | |
| LUPERSOL® PMS[4] | 108.0 | 108.0 |
| DOWANOL PM | 90.0 | 50.0 |
| Charge 3 | | |
| methacrylamide | 207.0 | 0.0 |
| acrylamide | 0.0 | 207.0 |
| DOWANOL PM | 828.0 | 828.0 |
| acrylic acid | 18.0 | 18.0 |
| Charge 4 | | |
| butyl acrylate | 270.0 | 283.0 |
| butyl methacrylate | 207.0 | 227.0 |
| styrene | 180.0 | 180.0 |
| methyl styrene dimer | 18.0 | 18.0 |
| Charge 5 | | |
| LUPERSOL PMS | 18.0 | 18.0 |
| DOWANOL PM | 18.0 | 18.0 |

[3] Propylene glycol methyl ether, available from Dow Chemical Co.
[4] Fifty percent solution of t-butyl peroctoate in odorless mineral spirits, available from Atochem North America, Inc.

EXAMPLE D

A monomer with both hydroxyl and primary amide functionality, 6-hydroxycaproamide, was prepared using the following procedure:

ε-Caprolactone (3000.0 g, 26.3 moles) was charged to a flask equipped with a mechanical stirrer and thermometer and cooled in an ice bath to below 5° C. A pre-cooled 30% solution of ammonium hydroxide (3100.0 g, 54.8 moles) was added and the reaction temperature was maintained below 5° C. until all caprolactone was consumed as indicated by gas chromatography. The water and excess ammonia were vacuum stripped at 50° C., at the completion of which the acid value was measured to be 2300. The acid by-product was removed via flocculation by addition of a methanolic solution of lithium hydroxide hydrate (58 g in 750 g methanol), ethyl acetate (2750 g), followed by isopropanol (250 g) until clarified. A second portion of ethyl acetate (2750 g) was added and the flocculated acid was filtered. All solvents were vacuum stripped at 50° C. to yield the 6-hydroxycaproamide (2750 g) as a pale yellow oil which crystallized upon standing at room temperature. Gas chromatographic and NMR spectral data indicated greater than 95% purity.

EXAMPLE E

A primary amide functional acrylic monomer, 6-carboaminohexyl methacrylate, was prepared using the following procedure:

To a flask equipped with a mechanical stirrer, thermocouple, and condenser were added 6-hydroxycaproamide (of EXAMPLE D)(249.0 g, 1.9 moles), methacrylic anhydride (328.0 g, 2.0 moles, 94% from Aldrich Chemical Co.), 2,6-di-t-butyl-4-methylphenol (BHT, 1.2 g), and triphenylphosphite (0.6 g). The contents were heated to 90° C. and held until all 6-hydroxycaproamide was consumed as indicated by gas chromatography. The contents were cooled to room temperature and toluene (500 g) was added. A solution of sodium hydroxide (88.0 g, 2.2 moles) in water (400 g) was added over 20 minutes and stirring was maintained for 30 minutes. The contents were transferred to a separatory funnel and the aqueous phase was removed. The organic phase was washed with two 200 millileter (ml) portions of deionized water, and the toluene was removed under reduced pressure at 80° C. The product (330 g) was a pale yellow liquid which crystallized upon standing at room temperature. Gas chromatography of the product indicated about 95% purity and NMR spectral data were consistent with the 6-carboaminohexyl methacrylate structure.

EXAMPLE F

A primary amide functional acrylic copolymer containing 6-carboaminohexyl methacrylate was prepared using the components listed in Table IV according to the following procedure:

A flask equipped with a mechanical stirrer, thermocouple, condenser, and nitrogen inlet was charged with EKTAPRO® EEP (70 g) and DOWANOL PM (65 g). The contents were heated to reflux (140° C.), and the initiator and monomer feeds were simultaneously added over two hours. The reaction mixture was then held at 140° C. for one hour at which time the two chase feeds were added at one-hour intervals in order to initiate polymerization of any remaining monomers. The reaction temperature was maintained at 140° C. for 1.5 additional hours to yield the acrylic resin.

TABLE IV

| Initiator Feed | |
|---|---|
| LUPERSOL 555M60[5] | 25.0 grams |
| EKTAPRO EEP[6] | 50.0 grams |
| Monomer Feed | |
| 6-Carboaminohexyl methacrylate of EXAMPLE E | 150.0 grams |
| Butylacrylate | 46.5 grams |
| Butylmethacrylate | 45.0 grams |
| Styrene | 48.0 grams |
| Acrylic acid | 6.0 grams |
| Methylmethacrylate | 1.5 grams |
| α-methyl styrene dimer | 3.0 grams |
| Chase Feed 1 | |
| LUPERSOL 555M60 | 2.0 grams |
| EKTAPRO EEP | 2.0 grams |
| Chase Feed 2 | |
| LUPERSOL 555M60 | 2.0 grams |
| EKTAPRO EEP | 2.0 grams |

[5]t-amyl peroxyacetate, 60 percent solution in odorless mineral spirits, available from Atochem North America, Inc.
[6]Ethyl-3-ethoxypropionate, available from Eastman Chemicals.

The resulting acrylic resin had a solids content of 60.5% (110° C./1 hr.), an amide equivalent weight of 398.0, and a Z+viscosity (Gardner-Holdt).

EXAMPLE G

A monomer with both hydroxy and N-methyl amide functional groups, N-methyl-6-hydroxycaproamide, was prepared from the following ingredients:

| Ingredients | Weight in grams |
|---|---|
| methylamine (40% in $H_2O$) | 803.0 |
| ε-caprolactone | 803.0 |

Methylamine (40% in $H_2O$) was charged to a suitable reactor and cooled to 5° C. with an ice bath. Epsilon-caprolactone was added to the reactor over 1.25 hours at a rate such that the reaction temperature did not exceed 5° C. Gas chromatographic analysis of the reaction mixture the following day showed that the reaction had proceeded to completion as determined by consumption of ε-caprolactone. The reaction was allowed to warm to room temperature. The reactor was equipped for vacuum distillation and $H_2O$ was stripped from the reaction at a vacuum of 1 mm Hg and a maximum temperature of 50° C. The resulting product was a slightly heavy yellow liquid which $^1$H NMR analysis confirmed was the desired product N-methyl-6-hydroxycaproamide.

EXAMPLE H

An N-methyl substituted amide methacrylate monomer, N-methyl 6-carboaminohexyl methacrylate, was prepared from the following ingredients according to the following procedure:

TABLE V

| Ingredients | Weight in grams |
|---|---|
| N-methyl-6-hydroxycaproamide of Example G | 239.3 |
| methacrylic anhydride | 304.9 |
| 4-dimethylaminopyridine | 0.5 |
| triphenyl phosphite | 0.5 |
| 2,6-di-t-butyl-4-methylphenol | 0.5 |
| toluene | 544.50 |
| sodium hydroxide | 99.0 |
| deionized $H_2O$ | 544.5 |
| deionized $H_2O$ | 247.5 |
| deionized $H_2O$ | 247.5 |
| deionized $H_2O$ | 247.5 |

The first five ingredients were charged to a suitable reactor and heated to 80° C. The reaction was held at this temperature until most, greater than (>) 95% of the N-methyl-6-hydroxycaproamide was consumed. The reaction was allowed to cool and toluene was added to the reaction mixture, followed by the sodium hydroxide/ deionized $H_2O$ solution. The reactor contents were allowed to stir for 15 minutes, then transferred to a separatory funnel. The organic and aqueous phases were separated. The organic phase was then washed with three equivalent portions of deionized $H_2O$. The organic phase was then subjected to gas chromatographic analysis; since the level of remaining methacrylic anhydride and methacrylic acid byproduct was deemed unacceptable, the extraction sequence was repeated. The organic phase was then returned to the reactor and the toluene stripped under reduced pressure to yield a light yellow liquid.

EXAMPLE I

An N-methyl substituted amide functional copolymer containing N-methyl-6-carboaminohexyl methacrylate was prepared from the following ingredients:

TABLE VI

| Ingredients | Weight in grams |
| --- | --- |
| Charge 1 | |
| EKTAPRO EEP | 70.0 |
| PROPASOL p[7] | 65.0 |
| Charge 2 | |
| LUPERSOL 555M60 | 25.0 |
| EKTAPRO EEP | 50.0 |
| Charge 3 | |
| N-methyl-6-carboaminohexyl methacrylate monomer of EXAMPLE H | 169.0 |
| methyl methacrylate | 1.5 |
| butyl methacrylate | 41.7 |
| butyl acrylate | 42.9 |
| styrene | 44.4 |
| acrylic acid | 6.0 |
| methyl styrene dimer | 3.0 |
| Charge 4 | |
| LUPERSOL 555M60 | 2.0 |
| EKTAPRO EEP | 2.0 |
| Charge 5 | |
| LUPERSOL 555M60 | 2.0 |
| EKTAPRO EEP | 2.0 |

[7]Propylene glycol monopropyl ether, available from Union Carbide Corp.

Charge 1 was added to a suitable reactor equipped with a condenser and heated to reflux (154.5° C.). Charges 2 and 3 were each separately mixed. Charge 2 was added to the reactor over three hours and 20 minutes. The addition of Charge 3 began 10 minutes after the beginning of Charge 2 and was carried out over a period of three hours. After the completion of Charges 2 and 3, the reaction was held at reflux for one hour. Charge 4 was then added and the reaction held after the completion of this charge for one hour. In a like manner Charge 5 was added and the reaction held for an additional 1.5 hours. The resulting resin was a transparent material that had a final measured solids content of 65.0%, a viscosity of W- on the Gardner-Holt scale, an amide equivalent weight of 390.6, a number average molecular weight of 1451, and a weight average molecular weight of 3478 both as determined by gel permeation chromatography.

EXAMPLE J

A monomer with both hydroxy and primary amide functional groups, N-butyl-6-hydroxycaproamide, was prepared using the following procedure:

ε-Caprolactone (800.0 g, 7.0 moles) was charged to a flask equipped with a mechanical stirrer, thermocouple, condenser, and nitrogen inlet. The contents were heated under a nitrogen blanket to 60° C., and n-butylamine (508 g, 6.95 moles) was added over 1 hour. The temperature was increased to 80° C. and held until the amine number fell below 5. The product was a pale yellow liquid and gas chromatographic analysis indicated about 94 percent purity.

EXAMPLE K

A primary amide functional acrylic monomer, N-butyl-6-carboaminohexyl methacrylate, was prepared as follows:

Following the procedure described in EXAMPLE E, N-butyl-6-hydroxycaproamide (of EXAMPLE J) (191.0 g, 1.0 mole) and methacrylic anhydride (195.0 g, 1.1 moles) were reacted to yield the methacrylate product (220 g) as a pale yellow liquid.

EXAMPLE L

A primary amide functional acrylic copolymer containing N-butyl-6-carboaminohexyl methacrylate was prepared as follows.

Following the procedure described in EXAMPLE F, the following feeds of Table VII were used to yield the acrylic resin.

TABLE VII

| Initiator Feed | |
| --- | --- |
| LUPERSOL 555M60 | 25.0 grams |
| EKTAPRO EEP | 50.0 grams |
| Monomer Feed | |
| N-Butyl-6-Carboaminohexyl Methacrylate of EXAMPLE K | 165.0 grams |
| Butylacrylate | 42.0 grams |
| Butylmethacrylate | 42.0 grams |
| Styrene | 43.5 grams |
| Acrylic acid | 6.0 grams |
| Methylmethacrylate | 1.5 grams |
| α-methyl styrene dimer | 3.0 grams |
| Chase Feed 1 | |
| LUPERSOL 555M60 | 2.0 grams |
| EKTAPRO EEP | 2.0 grams |
| Chase Feed 2 | |
| LUPERSOL 555M60 | 2.0 grams |
| EKTAPRO EEP | 2.0 grams |

The resulting acrylic resin had a solids content of 60.0% (110° C./1 hr.), an amide equivalent weight of 468.3, and H viscosity (Gardner-Holdt).

EXAMPLE M

A monomer with hydroxy and N-methyl amide functional groups, N-methyl lactamide, was prepared from the following ingredients:

| Ingredients | Weight in grams |
| --- | --- |
| methylamine (40% in $H_2O$) | 1192.0 |
| ethyl lactate | 1396.0 |

The first ingredient was charged to a flask equipped with an agitator under a nitrogen blanket. Ethyl lactate was added to the flask over 1 hour and 9 minutes at a rate such that the reactor temperature did not exceed 30° C. An ice bath was also placed under the flask during the addition to control the reaction temperature. After standing at room temperature overnight, analysis of the reaction mixture by gas chromatography indicated quantitative consumption of ethyl lactate. The flask was then equipped for vacuum distillation, the reaction mixture heated to 60° C., and $H_2O$ and by-product ethanol were stripped from the reaction under reduced pressure. When no more distillate was coming off the reaction, the flask was equipped with a Dean-Stark trap and toluene (500 g) was added to the reaction product. The reaction was held at 55° C. and sufficient vacuum was applied to the system to attain reflux. After one hour, the flask was reequipped for vacuum distillation and the toluene removed under reduced pressure. Residual H₂O was observed in the toluene distillate. Additional toluene (100 g) were added to the system and likewise stripped from the reaction. The resulting material was a yellow oil with an acid value of 55.5. $C^{13}$ NMR and gas chromatographic analysis indicated that the material was approximately 95% of the desired product, the major impurity being lactic acid formed by hydrolysis of ethyl lactate.

EXAMPLE N

An N-methyl substituted amide functional acrylic monomer, 1-(N-methylcarboamino)-ethyl methacrylate, was prepared as follows:

To a flask equipped with a condenser, thermocouple, and mechanical stirrer were charged N-methyllactamide of EXAMPLE M (204.0 g, 2.0 moles), methacrylic anhydride (360.0 g, 2.2 moles, 94%), 2,6-di-t-butyl-4-methylphenol (1.1 g), triphenylphosphite (0.55 g), and N,N-dimethylaminopyridine (0.55 g). The contents were stirred at 100° C. until all of the N-methyllactamide was consumed as indicated by gas chromatography. Upon cooling to room temperature, toluene (400.0 g) was added followed by a solution of sodium hydroxide (104.0 g) in deionized water (400.0 g). The suspension was stirred for one hour and the contents were transferred to a separatory funnel. The aqueous layer was removed and the organic layer was twice rinsed with deionized water. The remaining organic phase was vacuum stripped of toluene at 60° C., leaving the methacrylate product as a yellow oil. Purity as indicated by gas chromatography was 90–95 percent.

EXAMPLE O

An N-methyl substituted amide functional acrylic copolymer containing 1-(N-methylcarboamino)-ethyl methacrylate was prepared using the feeds described below and following the procedure described in EXAMPLE F, with two exceptions. The two exceptions were: the initial reflux temperature was 150° C. rather than 140° C., and the simultaneous addition of initiator and monomer feeds was over three hours rather than two hours.

TABLE VIII

| Initiator Feed | |
|---|---|
| LUPERSOL 555 | 25.0 g |
| EKTAPRO EEP | 50.0 g |
| Monomer Feed | |
| 1-(N-methylcarboamino)-ethyl methacrylate of EXAMPLE N | 129.0 g |
| Butyl Acrylate | 42.0 g |
| Butyl Methacrylate | 63.0 g |
| Styrene | 55.5 g |
| Acrylic Acid | 6.0 g |
| Methyl Methacrylate | 1.5 g |
| α-Methylstyrene Dimer | 3.0 g |
| Chase Feed 1 | |
| LUPERSOL 555 | 2.0 g |
| EKTAPRO EEP | 2.0 g |
| Chase Feed 2 | |
| LUPERSOL 555 | 2.0 g |
| EKTAPRO EEP | 2.0 g |

The resulting acrylic resin had a solids content of 60.7% (110° C./1 hr.), an amide equivalent weight of 397.0, and Z+viscosity (Gardner-Holdt).

EXAMPLE P

An acetylamino functional amide acrylic monomer, 2-(acetylamino)-ethyl methacrylate, was prepared as follows:

To a flask equipped with a condenser, thermocouple, and mechanical stirrer were charged N-acetylethanolamine (229.0 g, 2.0 moles), methacrylic anhydride (360.0 g, 2.2 moles, 94%), 2,4-di-t-butyl-4-methylphenol (0.59 g), and triphenylphosphite (1.2 g). The contents were stirred at 80° C. until all N-acetylethanolamine was consumed as indicated by gas chromatography. Upon cooling to room temperature, toluene (400 g) was added followed by a solution of sodium hydroxide (96 g) in deionized water (400 g). The contents were stirred for one hour and then transferred to a separatory funnel. A saturated sodium chloride solution (100 g) was added to aid in separation. The aqueous phase was removed and the organic phase was twice rinsed with deionized water. The remaining organic portion was vacuum stripped of toluene at 60° C. to yield the methacrylate product as a dark amber oil. Purity was determined to be about 90 percent by gas chromatographic analysis.

EXAMPLE Q

An acetyl amino functional amide acrylic copolymer containing 2-(acetylamino)-ethyl methacrylate was prepared from the components of Table IX according to the following procedure:

Following the procedure outlined in EXAMPLE O, the following feeds were used to yield the acrylic resin.

TABLE IX

| Initiator Feed | |
|---|---|
| LUPERSOL 555 | 25.0 g |
| EKTAPRO EEP | 50.0 g |
| Monomer Feed | |
| 2-(acetylamino)-ethyl methacrylate of EXAMPLE P | 120.0 g |
| Butyl Acrylate | 46.5 g |
| Butyl Methacrylate | 69.0 g |
| Styrene | 54.0 g |
| Acrylic Acid | 6.0 g |
| Methyl Methacrylate | 1.5 g |
| α-Methylstyrene Dimer | 3.0 g |
| Chase Feed 1 | |
| LUPERSOL 555 | 2.0 g |
| EKTAPRO EEP | 2.0 g |
| Chase Feed 2 | |
| LUPERSOL 555 | 2.0 g |
| EKTAPRO EEP | 2.0 g |

The resulting acrylic resin had a solids content of 56% (110° C./1 hr.), an amide equivalent weight of 427.5, and a viscosity of T (Gardner-Holdt).

EXAMPLE R (Comparative)

A polyester polyol was prepared from the ingredients of Table X.

TABLE X

| Ingredients | Weight in grams |
|---|---|
| trimethylolpropane | 995.0 |
| methylhexahydrophthalic anhydride | 3677.9 |
| 2,2-dimethyl-3-hydroxypropyl 2,2-dimethyl-3-hydroxypropanoate | 4558.4 |
| butyl stannoic acid | 13.9 |
| triphenyl phosphite | 9.2 |

The above ingredients were charged to a suitable reactor equipped with a glycol recovery column and a distillation head and heated to 210° C. with a nitrogen sparge. The reaction was held at this temperature with removal of water until an acid value of 3.1 was obtained. The final product was a transparent material with a viscosity of greater than Z10 on the Gardner-Holt viscosity scale, a measured solids of 98.0%, a OH value of 126.8 based on resin solids, a number average molecular weight of 1233, and a weight average molecular weight of 3029 as determined by gel permeation chromatography.

EXAMPLE S

An unsubstituted amide functional polyester was prepared from the following ingredients of Table XI:

TABLE XI

| Ingredients | Weight in grams |
| --- | --- |
| isophorone diisocyanate | 166.5 |
| dibutyl tin dilaurate | 0.3 |
| DOWANOL PM acetate[8] | 140.2 |
| 6-hydroxycaproamide of Example D | 117.9 |
| Polyester of Example R | 236.6 |
| dibutyl tin dilaurate | 0.3 |
| DOWANOL PM[9] | 140.2 |

[8]Propylene glycol methyl ether acetate, available from Dow Chemical Co.
[9]Propylene glycol methyl ether available from Dow Chemical Co.

EXAMPLE T

An N-methyl substituted amide functional polyester was prepared from the following ingredients of Table XII:

TABLE XII

| Ingredients | Weight in grams |
| --- | --- |
| isophorone diisocyanate | 155.4 |
| dibutyl tin dilaurate | 0.27 |
| DOWANOL PM acetate | 130.9 |
| N methyl-6-hydroxycaproamide of Example G | 121.8 |
| Polyester of Example R | 220.8 |
| dibutyl tin dilaurate | 0.3 |
| N-methyl-6-hydroxycaproamide of Example G | 5.0 |
| dibutyl tin dilaurate | 0.25 |
| DOWANOL PM | 130.9 |

The first three ingredients were charged to a suitable reactor under a nitrogen blanket and heated to 55° C. N-methyl 6-hydroxycaproamide of Example G was added to the reactor at a rate such that the reaction temperature was maintained below 60° C. After the completion of the addition, the reaction was held at 55° C. until the NCO equivalent weight was essentially constant. At this point the reaction temperature was raised to 75° C. and the polyester of Example R and additional dibutyl tin dilaurate were added to the reactor. The reaction was held at this temperature for five hours. At this point a small NCO peak was present in the infrared spectrum of the reaction product. A small amount of N-methyl 6-hydroxycaproamide and dibutyl tin dilaurate catalyst were added to consume the remaining isocyanate. Prior to thinning, the resulting resin had a hydroxyl value of 5.1. The reaction was then thinned with DOWANOL PM. The resulting resin was a transparent material with a viscosity of Z1+ on the Gardner-Holt viscosity scale, a measured solids of 66.1%, an amide equivalent weight of 575.3, a number average molecular weight of 1383, and a weight average molecular weight of 2855 as measured by gel permeation chromatography.

EXAMPLE U

An N-acetyl amine functional polyester was prepared generally according to the procedure of Example S from the below-listed ingredients of Table XIII. The difference in procedure was that N-acetyl ethanolamine was added rather than the solid 6-hydroxycaproamide.

TABLE XIII

| Ingredients | Weight in grams |
| --- | --- |
| isophorone diisocyanate | 170.9 |
| dibutyl tin dilaurate | 0.3 |
| DOWANOL PM acetate | 144.0 |
| N-acetyl ethanolamine | 95.3 |
| Polyester of Example R | 242.9 |
| dibutyl tin dilaurate | 0.3 |
| DOWANOL PM | 144.0 |

The resulting resin was a transparent material with a hydroxyl value of 3.0 prior to final thinning, a viscosity of Z2– on the Gardner-Holt viscosity scale, a measured solids of 62.5%, an amide equivalent weight of 550.2, a number average molecular weight of 1306, and a weight average molecular weight of 3616 as measured by gel permeation chromatography.

EXAMPLE V

An N-methyl amide and isocyanate functional adduct was prepared from the following ingredients of Table XIV:

TABLE XIV

| Ingredients | Weight in grams |
| --- | --- |
| isophorone diisocyanate | 610.5 |
| dibutyl tin dilaurate | 1.10 |
| DOWANOL PM acetate | 514.22 |
| N-methyl-6-hydroxycaproamide of Example G | 478.5 |

The first three ingredients were charged to a suitable reactor under a nitrogen blanket and heated to 55° C. N-methyl-6-hydroxycaproamide was added to the reactor over 50 minutes such that the reaction temperature remained below 60° C. The reaction was then held at 55° C. until the NCO equivalent weight was essentially constant. The resulting material had a measured NCO equivalent weight of 766.5, a measured solids content of 65.3%, and a viscosity of V on the Gardner-Holt scale.

EXAMPLE W

An N-methyl amide functional polyurethane polymer was prepared from the following ingredients of Table XV:

TABLE XV

| Ingredients | Weight in grams |
| --- | --- |
| trimethylolpropane | 11.0 |
| 3-hydroxy-2,2-dimethylpropyl 3-hydroxy-2,2-dimethylpropanoate | 50.4 |
| dibutyl tin dilaurate | 0.1 |
| DOWANOL PM acetate | 38.5 |
| isophorone diisocyanate | 53.7 |
| dibutyl tin dilaurate | 0.1 |

TABLE XV-continued

| Ingredients | Weight in grams |
|---|---|
| N-methyl-6-hydroxycaproamide/ isophorone diisocyanate adduct of Example V | 186.0 |
| DOWANOL PM | 54.4 |

The first four ingredients were charged to a suitable reactor under a nitrogen blanket and heated to 75° C. Isophorone diisocyanate was added to the reactor over a period of approximately 40 minutes such that the reaction temperature did not exceed 80° C. The reaction was held at 77° C. until no isocyanate was present in the material as determined by infrared spectroscopy (approximately 1 hour 55 minutes). A small amount of additional dibutyl tin dilaurate was then added to the reactor. The adduct of Example V was added over a period of five minutes and the reaction held at 77° C. After four hours a small amount of isocyanate was still present by infrared spectroscopy. An additional 2 g of 3-hydroxy-2,2-dimethylpropyl 3-hydroxy-2,2-dimethylpropanoate was added to the reactor and the reaction was held for an additional 5 hours and 15 minutes, after which no isocyanate was detectable by infrared spectroscopy. The resin was then thinned with DOWANOL PM. Prior to thinning the resin had a residual hydroxyl value of 16.2. The thinned resin was a transparent material that had a measured solids content of 64.3%, a viscosity of Z3+ on the Gardner-Holt scale, an amide equivalent weight of 643.2, a number average molecular weight of 1465, and a weight average molecular weight of 3440 as determined by gel permeation chromatography.

EXAMPLE X

An N-methyl amide functional polyether oligomer was prepared from the following ingredients:

| Ingredients | Weight in grams |
|---|---|
| N-methyl-6-hydroxycaproamide/ isophorone diisocyanate adduct of Example V | 383.3 |
| dibutyl tin dilaurate | 0.22 |
| POLYOL TP 30[10] | 44.5 |
| DOWANOL PM | 64.0 |

[10]Polyether polyol derived from the reaction of one mole of trimethylolpropane with three moles of ethylene oxide, available from Perstorp AB.

The first two ingredients were charged to a suitable reactor under a nitrogen blanket and heated to 75° C. The third ingredient was added to the reactor over a period of 15 minutes in a manner such that the reaction temperature did not exceed 80° C. The reaction was held for 11 hours and 45 minutes during which an additional 7 g of POLYOL TP 30 were added to consume unreacted isocyanate. The reaction was judged to be complete when no isocyanate was detectable in the resin by infrared spectroscopy. The reactor contents were then thinned with DOWANOL PM. Prior to thinning, the resin has a residual hydroxyl value of 14.3. The finished resin was a transparent material with a measured solids of 62.7%, a viscosity of Y on the Gardner-Holt scale, an amide equivalent weight of 389.1, a number average molecular weight of 1026 and a weight average molecular weight of 1339 as determined by gel permeation chromatography.

EXAMPLE Y (Comparative)

A high amide equivalent weight acrylic copolymer containing 6-carboaminohexyl methacrylate was prepared from the ingredients listed in Table XVI according to the following procedure:

A flask equipped with a mechanical stirrer, thermocouple, condenser, and nitrogen inlet was charged with EKTAPRO EEP (124 g) and PROPASOL P (115 g). The contents were heated to reflux and the initiator and monomer feeds were simultaneously added over three hours. The reaction mixture was then held at 150° C. for one hour. Then the two chase feeds were added at one hour intervals. The reaction temperature was maintained at 150° C. for 1.5 additional hours to yield the acrylic resin.

TABLE XVI

| | Weight in Grams |
|---|---|
| Initiator Feed | |
| LUPERSOL 555M60 | 44 |
| EKTAPRO EEP | 88 |
| Monomer Feed | |
| 6-carboaminohexyl methacrylate of EXAMPLE E | 133 |
| Butylacrylate | 82 |
| Butylmethacrylate | 212 |
| Styrene | 85 |
| Acrylic acid | 10.6 |
| Methylmethacrylate | 2.7 |
| α-methyl styrene dimer | 5.3 |
| Chase Feed 1 | |
| LUPERSOL 555M60 | 3.5 |
| EKTAPRO EEP | 3.5 |
| Chase Feed 2 | |
| LUPERSOL 555M60 | 3.5 |
| EKTAPRO EEP | 3.5 |

The resulting resin had a solid content of 61.8% (110° C./1 hr.), X viscosity (Gardner-Holdt), an amide equivalent weight of 794.3, weight average molecular weight of 8,737, and a polydispersity index of 3.03.

The following examples (1–17) show the preparation of various clear film-forming compositions prepared with the polymers of Examples A-Y and aminoplast curing agent. The clear film-forming compositions were evaluated as clear coats in composite color-plus-clear coatings.

EXAMPLE 1 (Comparative)

A clear film-forming composition was prepared by mixing together the ingredients of Table XVII in the order listed:

TABLE XVII

| Ingredients | Solid Weight In Grams | Solution Weight In Grams |
|---|---|---|
| n-amyl propionate | 0 | 25.0 |
| methyl n-amyl ketone | 0 | 47.0 |
| TINUVIN ® 900[11] | 1.5 | 1.5 |
| TINUVIN 328[12] | 1.5 | 1.5 |
| TINUVIN 123[13] | 0.6 | 0.6 |
| TINUVIN 292[14] | 0.4 | 0.4 |
| Rheology Modifier[15] | 5.4 | 12.6 |
| Polybutylacrylate Solution[16] | 0.4 | 0.7 |
| CYMEL ® 202[17] | 35.0 | 43.8 |

TABLE XVII-continued

| Ingredients | Solid Weight In Grams | Solution Weight In Grams |
|---|---|---|
| Acrylic Polyol of Example A | 60.6 | 86.6 |
| Phenylacid Phosphate Solution[18] | 1.0 | 1.3 |

[11] 2-(2'-hydroxy-benzotriazol-2-yl)-4,6-bis(methyl-1-phenylethyl)phenol available from Ciba-Geigy Corp.
[12] 2-(2'-Hydroxy-3',5'-ditert-amylphenyl)benzotriazole UV light stabilizer available from Ciba-Geigy Corp.
[13] Sterically hindered tertiary amine light stabilizer available from Ciba Geigy Corporation.
[14] Sterically hindered tertiary amine light stabilizer available from Ciba Geigy Corporation.
[15] Resin additive for flow control and sag prevention.
[16] Sixty percent solution in xylene.
[17] Partially alkylated (mixed methyl/butyl) melamine formaldehyde resin available from CYTEC Industries, Inc.
[18] Seventy-seven percent solution in water.

The clear film-forming composition of EXAMPLE 1 had a hydroxyl value of 84.0 based on the total weight of resin solids in the clear film-forming composition.

EXAMPLE 2

A clear film-forming composition was prepared by mixing together the following ingredients of Table XVIII in the order listed:

TABLE XVIII

| Ingredients | Solid Weight In Grams | Solution Weight In Grams |
|---|---|---|
| n-amyl propionate | 0 | 30.6 |
| methyl n-amyl ketone | 0 | 17.0 |
| ethyl alcohol | 0 | 6.0 |
| SOLVESSO 100 | 0 | 10.0 |
| TINUVIN 900 | 1.5 | 1.5 |
| TINUVIN 328 | 1.5 | 1.5 |
| TINUVIN 123 | 0.6 | 0.6 |
| TINUVIN 292 | 0.4 | 0.4 |
| Polybutylacrylate Solution | 0.4 | 0.7 |
| CYMEL 202 | 35.0 | 43.8 |
| Amide Containing Acrylic of Example B | 65.0 | 109.6 |
| Phenylacid Phosphate Solution | 1.0 | 1.3 |

The clear film-forming composition of EXAMPLE 2 had a hydroxyl value of 0 based on the total weight of resin solids in the clear film-forming composition.

The clear coat formulations of Examples 3–16 had eight components in common, used in the same amounts as in Example 2. The formulations were prepared as in Example 2, differing only in solvent content and type of amide-containing polymer. The common components and their amounts in each of the clear coat formulations of Examples 3–16 are as follows in Table XIX:

TABLE XIX

| Ingredients | Solid Weight In Grams | Solution Weight In Grams |
|---|---|---|
| TINUVIN 900 | 1.5 | 1.5 |
| TINUVIN 328 | 1.5 | 1.5 |
| TINUVIN 123 | 0.6 | 0.6 |
| TINUVIN 292 | 0.4 | 0.4 |
| Rheology Modifier | 5.4 | 12.6 |
| Polybutylacrylate Solution | 0.4 | 0.7 |

TABLE XIX-continued

| Ingredients | Solid Weight In Grams | Solution Weight In Grams |
|---|---|---|
| CYMEL 202 | 35.0 | 43.8 |
| Phenylacid Phosphate Solution | 1.0 | 1.3 |

EXAMPLES 3, 4 and 5

Clear film-forming compositions were prepared by combining the common components of Table XIX and the ingredients of Table XX in the amounts shown for each of the below-listed examples, where the order of addition followed that of Example 2:

TABLE XX

| | n-amyl propionate | methyl n-amyl ketone | Amide containing acrylic of EXAMPLE C | Amide containing acrylic of EXAMPLE F | Amide containing acrylic of EXAMPLE L |
|---|---|---|---|---|---|
| Example 3 | | | | | |
| Solid Weight In Grams | 0 | 0 | 60.6 | — | — |
| Solution Weight In Grams | 25.0 | 63.0 | 98.7 | — | — |
| Example 4 | | | | | |
| Solid Weight In Grams | 0 | 0 | — | 60.6 | — |
| Solution Weight In Grams | 25.0 | 49.0 | — | 100.2 | — |
| Example 5 | | | | | |
| Solid Weight In Grams | 0 | 0 | — | — | 60.6 |
| Solution Weight In Grams | 25.0 | 11.0 | — | — | 101.0 |

EXAMPLES 6, 7 and 8

Clear film-forming compositions were prepared by combining the common components and the following ingredients of Table XXI in the amounts shown for each example and in an order similar to that for Examples 3, 4, and 5.

TABLE XXI

| | Example | | | | | |
|---|---|---|---|---|---|---|
| | 6 | | 7 | | 8 | |
| Ingredients | Solid[1] | Solution[2] | Solid[1] | Solution[2] | Solid[1] | Solution[2] |
| SOLVESSO 100 | 0 | 15.0 | 0 | 20.0 | 0 | 20.0 |
| DOWANOL PM | 0 | 3.0 | 0 | 2.0 | 0 | 2.0 |
| ethyl alcohol | 0 | 5.0 | 0 | — | 0 | — |
| Methyl n-amyl ketone | — | — | 0 | 16.0 | — | 12.0 |

TABLE XXI-continued

| | Example | | | | | |
|---|---|---|---|---|---|---|
| | 6 | | 7 | | 8 | |
| Ingredients | Solid[1] | Solution[2] | Solid[1] | Solution[2] | Solid[1] | Solution[2] |
| n-amyl alcohol | 0 | 34.0 | 0 | 28.6 | 0 | 20.2 |
| Amide containing acrylic of EXAMPLE I | 60.6 | 93.1 | — | — | — | — |
| Amide containing acrylic of EXAMPLE O | — | — | 60.6 | 99.8 | — | — |
| Amide containing acrylic of EXAMPLE Q | — | — | — | — | 60.6 | 108.2 |

[1]Solid weight in grams.
[2]Solution weight in grams.

The clear film-forming composition of Examples 3–8 all had a hydroxyl value of 6.0 based on the total weight of resin solids in the clear film-forming composition.

EXAMPLES 9 (Comparative) and 10–14

Clear film-forming compositions were prepared by combining the common components and the below-listed additional components of Table XXII in the amounts shown for each of the examples and in the order as in Example 2. The total solid weight of polymer in each of the examples was 60.6 g. Amounts listed in the table are solution weights in grams.

TABLE XXII

| | EXAMPLES | | | | | |
|---|---|---|---|---|---|---|
| Components | 9 Amounts | 10 Amounts | 11 Amounts | 12 Amounts | 13 Amounts | 14 Amounts |
| n-amyl propionate | 25.0 | 25.0 | 25.0 | 25.0 | 25.0 | 25.0 |
| methyl n-amyl ketone | 5.0 | 5.0 | 5.0 | 5.0 | 5.0 | 5.0 |
| n-amyl alcohol | 20.0 | 41.5 | 30.0 | 35.0 | 31.0 | 20.0 |
| Polyester polyol of EXAMPLE R | 80.4 | — | — | — | — | — |
| Amide functional polyester of EXAMPLE S | — | 97.2 | — | — | — | — |
| Amide functional polyester of EXAMPLE T | — | — | 91.7 | — | — | — |
| Amide functional polyester of EXAMPLE U | — | — | — | 94.0 | — | — |
| Amide functional polyurethane of EXAMPLE W | — | — | — | — | 94.2 | — |
| Amide functional polyether of EXAMPLE X | — | — | — | — | — | 96.7 |
| hydroxyl value[19] | 78.0 | 12.0 | 9.0 | 7.0 | 15 | 14 |

[19]The hydroxyl value of the clear film-forming compositions was based on the total weight of resin solids in the clear film-forming composition.

EXAMPLES 15 and 16 (Comparative)

Clear film-forming compositions were prepared by combining the common components and the below-listed components in an order as in Example 2 in the amounts shown for each of Examples 15 and 16 as shown in Table XXIII. The total solid weight of polymer or oligomer in each of the examples was 60.6 g. (In Example 15, 30.3 g amide functional acrylic of EXAMPLE I and 30.3 g amide functional polyester of EXAMPLE T.) Amounts listed in the table are solution weight in grams.

TABLE XIII

|  | Examples | |
|---|---|---|
| Components | 15 Amounts | 16 Amounts |
| SOLVESSO 100 | 15.0 | 20.0 |
| DOWANOL PM | 3.0 | 2.0 |
| ethyl alcohol | 5.0 | — |
| methyl n-amyl ketone | — | 19.0 |
| n-amyl alcohol | 39.0 | 30.3 |
| Amide functional acrylic of EXAMPLE I | 46.5 | — |
| Amide functional polyester of EXAMPLE T | 45.8 | — |
| Amide functional acrylic of EXAMPLE Y | — | 98.1 |
| hydroxyl value | 7.0 | 6.0 |

EXAMPLE 17

A clear film-forming composition was prepared by mixing together the following ingredients in the order listed in Table XXIV:

TABLE XXIV

| Ingredients | Solid Weight In Grams | Solution Weight In Grams |
|---|---|---|
| n-amyl propionate | 0 | 25.0 |
| methyl n-amyl ketone | 0 | 5.0 |
| n-amyl alcohol | 0 | 22.0 |
| TINUVIN 900 | 1.5 | 1.5 |
| TINUVIN 328 | 1.5 | 1.5 |
| TINUVIN 123 | 0.6 | 0.6 |
| TINUVIN 292 | 0.4 | 0.4 |
| Rheology Modifier | 5.4 | 12.6 |
| Polybutylacrylate Solution | 0.4 | 0.7 |
| CYMEL 1130[20] | 35.0 | 35.0 |
| Amide functional acrylic of EXAMPLE I | 60.6 | 97.0 |
| DDBSA solution[21] | 1.0 | 1.4 |

[20]Fully alkylated mixed methoxy/butoxy melamine formaldehyde resin available from CYTEC Industries, Inc.
[21]70% solution of dodecyl benzene sulfonic acid The clear film-forming composition of EXAMPLE 17 had a hydroxyl value of 6.0 based on the total weight of resin solids in the clear film-forming composition.

The film-forming compositions of EXAMPLES 1–17 were applied to a pigmented basecoat to form color-plus-clear composite coatings over electrocoated steel substrates. The electrocoat used on the steel is commercially available from PPG Industries, Inc. and is identified as ED-5000. The pigmented basecoat for EXAMPLES 1–16, identified as HWBS-9517, was pigmented black in color and is available from PPG Industries, Inc. The pigmented basecoat for EXAMPLE 17, identified as DCT-6373, was pigmented black in color and is available from PPG Industries, Inc.

The basecoat was spray applied to the electrocoated steel panels at a temperature of about 72° F. (22.2° C.). The basecoat was then given a flash time prior to clearcoating. Panels coated with the HWBS-9517 were given a heated flash at 200° F. (93.3° C.) for five minutes. Panels coated with DCT-6373 were given an ambient flash for 5 to 15 minutes. The clear coating compositions of EXAMPLES 1–17 were each applied to a basecoat panel in two coats with a 90-second ambient flash allowed between coats. The composite coating was given an ambient flash for 10 to 15 minutes prior to baking. The composite coatings were baked at 285° F. (141° C.) for 25 minutes to cure both the basecoat and the clearcoat. The panels were baked in the horizontal position. The properties of the composite coatings of Examples 1–17 are reported in the Table XXV below.

In Table XXV Acid Etch Rating was measured in the following manner. A solution of 35 parts deionized water and 1.2 parts sulfurous acid was prepared. The solution was applied to the surface of the test panels in the form of two rows of 50 microliter droplets using a 50 microliter octapette. The panels were then baked at 120° F. (49° C.) for 20 minutes. Then the panels were removed from the oven and the procedure was repeated two times to give a total of one hour at 120° F. (49° C.). After the third cycle, the panels were washed with soap and water and then dried. The panels were rated for severity of acid etch against a set of standard controls. The scale is from '0' to '10', with a rating of '0' indicating no visible etching and a rating of '10' indicating severe etching. Also, the Tukon hardness is the Knoop hardness value measured using a Tukon Microhardness Tester Model 300 from Wilson Instruments according to ASTM D1474-92. Higher values indicate harder coatings and lower values indicate softer coatings.

TABLE XXV

| EXAMPLE | POLYMER EXAMPLE | TYPE OF POLYMER IN CLEAR COAT | HYDROXYL NUMBER OF CLEAR COAT | ACID ETCH RATING | TUKON HARDNESS |
|---|---|---|---|---|---|
| 1* | A | Acrylic polyol | 84 | 9 | 15.4 |
| 2 | B | Methacrylamide | -0- | 4 | 15.1 |
| 3 | C | Acrylamide | 6 | 4 | 13.2 |
| 4 | F | 6-carboaminohexyl methacrylate | 6 | 3 | 15.4 |
| 5 | L | N-butyl-6-carbo-aminohexyl methacrylate | 6 | 6 | 5.6 |
| 6 | I | N-Methyl-6-carbo-aminohexyl methacrylate | 6 | 4 | 8.1 |
| 7 | O | 1-(N-methylcarboamino)-ethyl methacrylate | 6 | 6 | 11.1 |

TABLE XXV-continued

| EXAMPLE | POLYMER EXAMPLE | TYPE OF POLYMER IN CLEAR COAT | HYDROXYL NUMBER OF CLEAR COAT | ACID ETCH RATING | TUKON HARDNESS |
|---|---|---|---|---|---|
| 8 | Q | 2-(acetylamino)-ethyl methacrylate | 6 | 6 | 7.6 |
| 9* | R | polyester polyol | 78 | 8 | 17.3 |
| 10 | S | primary amide functional polyester | 12 | 2 | 20.7 |
| 11 | T | N-methyl amide functional polyester | 9 | 2 | 20.5 |
| 12 | U | N-acetylamine functional polyester | 7 | 3 | 23.1 |
| 13 | W | N-methyl amide functional polyurethane | 15 | 5.5 | 22.7 |
| 14 | X | N-methyl amide functional polyether | 14 | 4.5 | 22.4 |
| 15 | I & T | N-methyl amide acrylic and polyester | 7 | 3.5 | 14.7 |
| 16* | Y | 6-carboaminohexyl methacrylate | 6 | 9 | 6.7 |
| 17 | I | N-methyl amide acrylic | 6 | 6 | 10.4 |

*Comparative Examples.

The data in the Table XXV illustrate that coating compositions of the present invention provide superior acid etch resistance and comparable hardness when compared to conventional hydroxyl-aminoplast cured coating compositions (Examples 1 and 9). Hardness is better in acrylic systems with unsubstituted amide functionality than in systems with N-alkyl or N-acyl functionality. Note that as shown by comparative Example 16, performance diminishes when the amide equivalent weight of the acrylic polymer in the coating composition is too high (i.e., when the amide functionality in the polymer is too low.)

Therefore, we claim:

1. A curable film-forming composition comprising (i) a polymer or oligomer present in the film-forming composition in amounts of about 10 to 75 percent by weight based on the total weight of resin solids in the film-forming composition and selected from the group consisting of (a) an acrylic polymer or oligomer containing a plurality of groups of at least one of the structures:

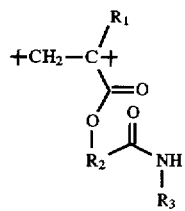

and

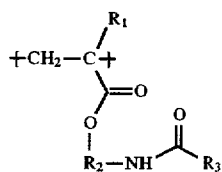

wherein $R_1$ is hydrogen or methyl, $R_2$ is a divalent linking group having about 1 to 30 carbon atoms when the group is of Structure I, or $R_2$ is alkylene having about 2 to 13 carbon atoms when the group is of structure II, and $R_3$ is hydrogen or lower alkyl having 1 to 4 carbon atoms; (b) a polyester polymer or oligomer; (c) a polyurethane polymer or oligomer; (d) a polyether polymer or oligomer, wherein (b), (c) and (d) each have a plurality of terminal amide groups of at least one of the structures:

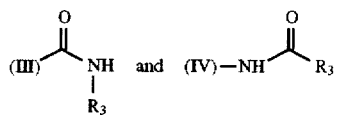

wherein $R_3$ is hydrogen or lower alkyl having 1 to 4 carbon atoms; and (e) mixtures of more than one of (a), (b), (c) and (d); and (ii) an aminoplast crosslinking agent containing methylol and/or methylol ether groups, present in the film-forming composition in amounts of about 25 to 55 percent by weight based on the total weight of resin solids in the film-forming composition; wherein prior to curing, the film-forming composition has a theoretical hydroxyl value less than about 50 based on total resin solid weight of the film-forming composition, excluding any hydroxyl functionality associated with N-methylol groups.

2. The film-forming composition of claim 1 wherein the a polymer or oligomer of (i) is present in the film-forming composition in amounts of about 25 to 70 percent by weight based on the total weight of resin solids in the film-forming composition.

3. The film-forming composition of claim 1 wherein the polymer or oligomer is an acrylic polymer or oligomer and contains a plurality of groups of at least one of the Structures I and II, wherein $R_1$ is hydrogen or methyl, $R_2$ is a divalent linking group having about 1 to 30 carbon atoms when the group is of structure I, or $R_2$ is alkylene having about 2 to 13 carbon atoms when the group is of structure II, and $R_3$ is hydrogen or lower alkyl having 1 to 4 carbon atoms, wherein said acrylic polymer or oligomer has an amide equivalent weight of less than 700 and a number average molecular weight of 1000 to 10,000 and a weight average molecular weight from 1500 to 20,000.

4. The film-forming composition of claim 3 wherein $R_2$ is selected from the group consisting of ethylene, methyl methylene, methyl ethylene, propylene, dimethyl propylene, butylene, and pentylene.

5. The film-forming composition of claim 3 wherein $R_3$ is hydrogen or methyl.

6. The film-forming composition of claim 1 wherein the acrylic polymer or oligomer of Structure I has $R_2$ as a divalent linking group having 2 to 20 carbon atoms, and when $R_2$ has two carbon atoms, $R_2$ is methyl methylene, and wherein when $R_2$ contains urethane linkages and said acrylic polymer or oligomer is prepared with acid functional ethylenically unsaturated monomers, said acid functional monomers are used in amounts of less than about 2 percent by weight, based on the total solid weight of monomers used to prepare the polymer.

7. The film-forming composition of claim 6 wherein R₂ has the structure:

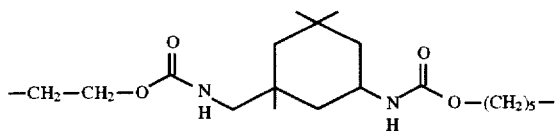

8. The film-forming composition of claim 7 wherein said R₂ groups are derived from the reaction product of hydroxyethyl methacrylate, isophorone diisocyanate, and 6-hydroxycaproamide.

9. The film-forming composition of claim 1 wherein the acrylic polymer or oligomer with a plurality of groups of at least one of Structure I and II is the addition polymerization product with at least one ethylenically unsaturated monomer.

10. The film-forming composition of claim 9 wherein the at least one ethylenically unsaturated monomer is selected from the group consisting of: one or more alkyl esters of acrylic acid and methacrylic acid and optionally one or more other polymerizable ethylenically unsaturated monomers.

11. The film-forming composition of claim 1 wherein the polymer or oligomer is a polyester polymer or oligomer and contains a plurality of terminal amide groups of at least one of the Structures of III and IV, wherein R₃ is hydrogen or lower alkyl having 1 to 4 carbon atoms, and wherein the polyester polymer or oligomer has an amide equivalent weight of from about 200 to about 600, and a number average molecular weight of about 500 to about 5000 and a weight average molecular weight of about 1000 to about 10,000.

12. The film-forming composition of claim 11 wherein the polyester is the reaction product of the group consisting of:

I) the reaction product of a polyester selected from the group consisting of: (A) an acid terminal polyester and (B) lower alkyl ester terminal polyester and of a compound selected from the group consisting of: (C) hydroxyl functional amide and (D) N-acetyl alkanol amine wherein when (D) is reacted with a polyester the polyester is (A), and II) reaction product of (E) hydroxyl functional amide selected from the group consisting of an N-alkanol substituted amide and reaction product of ring-opened lactone with a compound selected from ammonia and primary amine with (F) diisocyanate to form an isocyanate functional amide, and (G) hydroxyl terminal polyester.

13. The film-forming composition of claim 11 wherein the polyester polymer with plurality of terminal amide groups is the transesterification reaction product of hydroxyl functional amides and acid terminal or lower alkyl terminal polyester.

14. The film-forming composition of claim 1 wherein the polymer or oligomer is a polyurethane polymer or oligomer and contains a plurality of terminal amide groups of at least one of the Structures of III and IV, wherein R₃ is hydrogen or lower alkyl having 1 to 4 carbon atoms, and wherein the polyurethane polymer or oligomer has an amide equivalent weight of from about 200 to about 1000, and a number average molecular weight of about 500 to about 5000 and a weight average molecular weight of about 1000 to about 10,000.

15. The film-forming composition of claim 14 wherein the polyurethane polymer or oligomer has terminal amide groups as a reaction product of the group consisting of:

I) isocyanate functional polyurethane through reaction of the isocyanate groups on the polyurethane with a compound selected from the group consisting of: hydroxyl functional amide and N-acyl alkanol amine.

II) hydroxyl functional amide selected from the group consisting of N-alkanol substituted amide and reaction product of ring-opened lactone with a compound selected from ammonia and primary amine and diisocyanate to form an isocyanate functional amide, and further reaction with the hydroxyl functional polyurethane; and III) hydroxyl compound selected from the group of hydroxyl functional amide and N-alkanol substituted amide with a diisocyanate to form an isocyanate functional amide which is reacted with the hydroxyl functional polyurethane.

16. The film-forming composition of claim 1 wherein the polymer or oligomer is a polyether polymer or oligomer and contains a plurality of terminal amide groups of at least one of the structures of (III) and (IV) wherein R₃ is hydrogen or lower alkyl having 1 to 4 carbon atoms, and wherein the polyether polymer or oligomer has an amide equivalent weight of from about 200 to about 1000, and a number average molecular weight of about 500 to about 3000 and a weight average molecular weight of about 1000 to about 6000.

17. The film-forming composition of claim 16 wherein the polyether polymer or oligomer has terminal amide groups through reaction of hydroxyl compound selected from the group consisting of hydroxyl functional amide and N-alkanol substituted amide with a diisocyanate to form an isocyanate functional amide, and a subsequent reaction of the hydroxyl groups on the polyether with the isocyanate functional amide.

18. The film-forming composition of claim 16 wherein the polyether polymer or oligomer has terminal amide groups of structures IV incorporated into the polyether from a first reaction an N-alkanol substituted amide with a diisocyanate to form an isocyanate functional amide, and a subsequent reaction of the hydroxyl groups on the polyether with the isocyanate functional amide.

19. The film-forming composition of claim 1 wherein said aminoplast is a condensate of melamine with formaldehyde and optionally an alcohol containing from 1 to 4 carbon atoms.

20. The film-forming composition of claim 1 wherein said composition is solventborne.

21. The film-forming composition of claim 1 wherein the polymer or oligomer is present in the film-forming composition prior to curing for the predominant crosslinking mechanism of the film-forming composition with the aminoplast through groups selected from the group consisting of methylol and methylol ether substituted nitrogens and through the amide groups of the polymer or oligomer selected from the group consisting of at least one of pendant and terminal amide groups.

22. A multi-component composite coating composition comprising a pigmented film-forming composition serving as a base coat and a clear film-forming composition serving as a transparent coat over top of the base coat wherein the transparent clear coat is a curable film-forming composition comprising (i) a polymer or oligomer present in the clear film-forming composition in amounts of about 10 to 75 percent by weight based on the total weight of resin solids in the clear film-forming composition and selected from the group consisting of (a) an acrylic polymer or oligomer containing a plurality of groups of at least one of the structures:

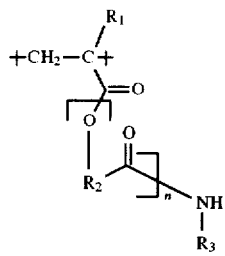

and

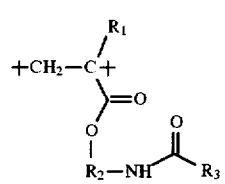

wherein n is 0 or 1, $R_1$ is hydrogen or methyl, $R_2$ is a divalent linking group having about 1 to 30 carbon atoms when the group is of the first structure, or $R_2$ is alkylene having about 2 to 13 carbon atoms when the group is of structure II, and $R_3$ is hydrogen or lower alkyl having 1 to 4 carbon atoms; (b) a polyester polymer or oligomer; (c) a polyurethane polymer or oligomer; (d) a polyether polymer or oligomer, wherein (b), (c) and (d) each have a plurality of terminal amide groups of at least one of the structures:

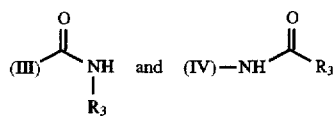

wherein $R_3$ is hydrogen or lower alkyl having 1 to 4 carbon atoms; and (e) mixtures of more than one of (a), (b), (c) and (d); and (ii) an aminoplast crosslinking agent containing methylol and/or methylol ether groups, present in the clear film-forming composition in amounts of about 25 to 90 percent by weight based on the total weight of resin solids in the clear film-forming composition; wherein prior to curing, amide functionality on the polymer or oligomer is the predominant crosslinking functionality for the clear film-forming composition and the clear film-forming composition has a theoretical hydroxyl value less than about 50 based on total resin solid weight of the clear film-forming composition, excluding any hydroxyl functionality associated with N-methylol groups; and wherein after curing, the clear film-forming composition exhibits a high level of acid etch resistance.

23. The film-forming composition of claim 22 wherein the a polymer or oligomer of (i) is present in the film-forming composition in amounts of about 25 to 70 percent by weight based on the total weight of resin solids in the film-forming composition.

24. The multi-component composite coating composition of claim 22 wherein the acrylic polymer or oligomer has $R_2$ as a divalent linking group having 2 to 13 carbon atoms.

25. The multi-component composite coating composition of claim 22 wherein in the first structure n=1 and $R_2$ is selected from the group consisting of ethylene, methyl methylene, and pentylene.

26. The multi-component composite coating composition of claim 22 wherein $R_3$ is hydrogen or methyl.

27. The multi-component composite coating composition of claim 22 wherein the acrylic polymer or oligomer has an amide equivalent weight of from about 200 to 600 and a number average molecular weight of 1000 to 5000 and a weight average molecular weight from 2000 to 6000.

28. The multi-component composite coating composition of claim 22 wherein the polymer or oligomer is a polyester polymer or oligomer having an amide equivalent weight of from about 200 to 600 and a number average molecular weight of 1000 to 3000 and a weight average molecular weight from 2000 to 6000.

29. The multi-component composite coating composition of claim 22 wherein the polymer or oligomer is a polyurethane polymer or oligomer that has an amide equivalent weight of from about 200 to about 750 and a number average molecular weight of 1000 to 3000 and a weight average molecular weight from 2000 to 6000.

30. The multi-component composite coating composition of claim 22 wherein the polymer or oligomer is a polyether polymer or oligomer that has an amide equivalent weight of from about 200 to 600 and a number average molecular weight of 800 to 2000 and a weight average molecular weight from 1000 to 6000.

31. The multi-component composite coating composition of claim 22 wherein the aminoplast is present in the clear film-forming composition in amounts of about 25 to 55 percent based on the total weight of resin solids in the clear film-forming composition.

32. The multi-component composite coating composition of claim 22 wherein said aminoplast is a condensate of melamine with formaldehyde and optionally an alcohol containing from 1 to 4 carbon atoms.

33. The multi-component composite coating composition of claim 22 wherein said clear film-forming composition is solventborne.

34. The multi-component composite coating composition of claim 23 wherein the equivalent ratio of the pendant and/or terminal amide groups in the polymers or oligomers to methylol or methylol ether groups in the aminoplast is from about 0.5:1 to about 2:1.

35. The film-forming composition of claim 3 wherein $R_3$ is a lower alkyl having 1 to 4 carbon atoms.

* * * * *

UNITED STATES PATENT AND TRADEMARK OFFICE
CERTIFICATE OF CORRECTION

PATENT NO. : 5,780,559
DATED : July 14, 1998
INVENTOR(S) : Humbert et al.

It is certified that error appears in the above-identified patent and that said Letters Patent is hereby corrected as shown below:

Please amend claim 34 in the following manner:

<u>Column 38,</u>
Line 50, please delete the claim dependency "23" and insert --22--.

Signed and Sealed this

Seventh Day of August, 2001

Attest:

NICHOLAS P. GODICI
Attesting Officer    Acting Director of the United States Patent and Trademark Office